Aug. 28, 1956  G. M. VANATOR  2,760,369
VIBRATION ANALYZER
Filed March 26, 1952
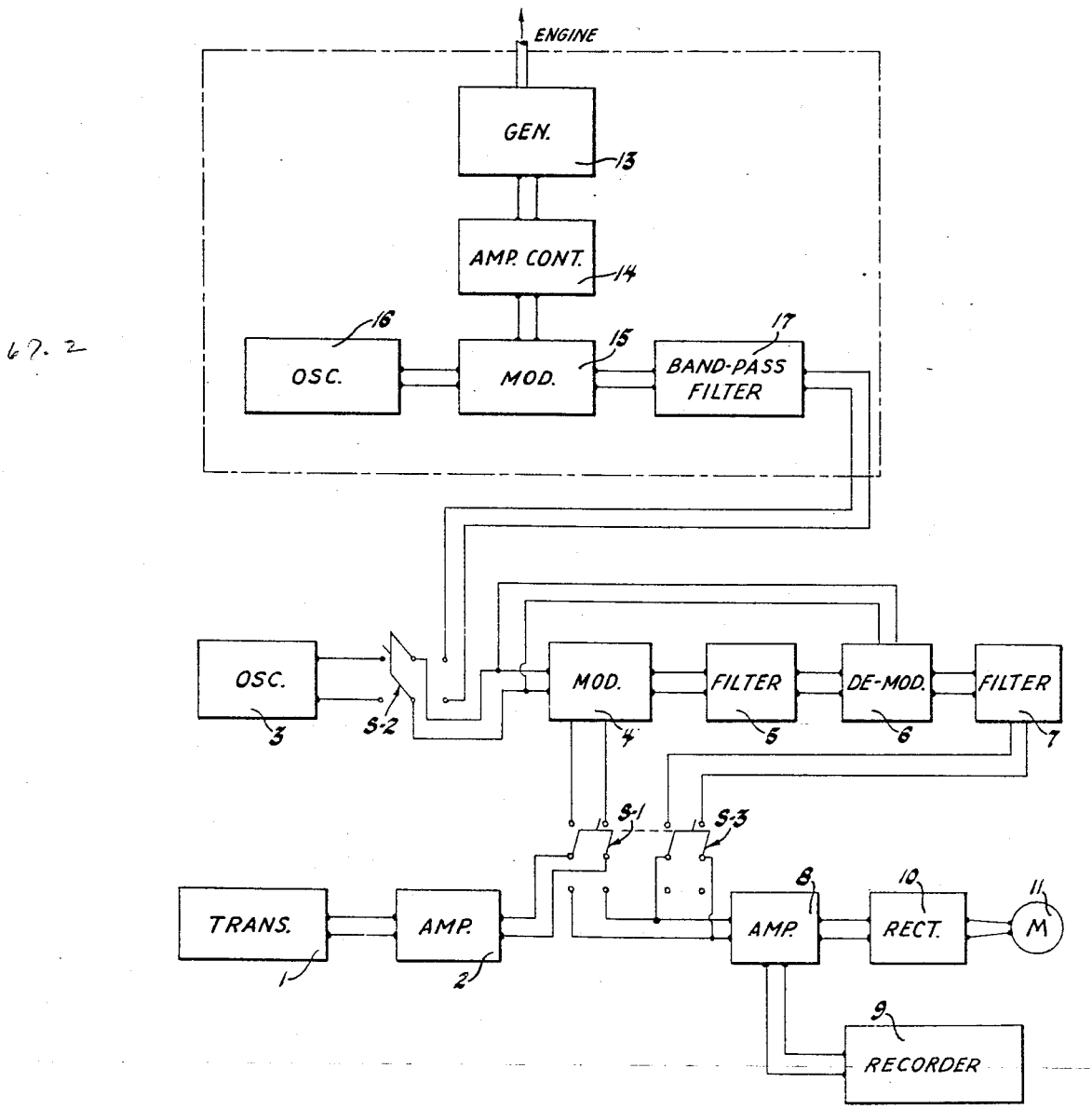
INVENTOR.
George M. Vanator
BY
Willits, Helwig & Baillio
ATTORNEYS

United States Patent Office 2,760,369
Patented Aug. 28, 1956

2,760,369
VIBRATION ANALYZER

George M. Vanator, Milford, Mich., assignor to General Motors Corporation, Detroit, Mich., a corporation of Delaware Application March 26, 1952, Serial No. 278,641

6 Claims. (Cl. 73—67)

This invention relates to vibration analyzers and, more particularly, to an automatically tuned vibration analyzer adapted to provide vibration analyses in terms of the rotational speed of a variable speed vibration producing agency such as an automobile engine, for example.

Engine vibration studies are usually conducted with heterodyne frequency analyzers which, with their associated amplitude recorders, also called level recorders, provide a record of the amplitude of the vibration components of a complex vibration pattern in terms of frequency under a constant vibration producing or operating speed condition. These studies indicate that the principal vibration components occur at frequencies which are related to the engine speed by some multiple or submultiple thereof and which can be expressed as $f=ns$, where $n$ is a rational number representing a particular order of vibration and $s$, revolutions per second.

In order to investigate the vibration characteristics of an automobile engine over a wide range of operating speeds, it has been necessary to obtain a large number of curves of vibration amplitude against frequency at suitably separated speed values as parameters, and to plot therefrom curves representing variations in amplitude of particular vibration components with changes in engine speed. Such a process is not only tedious and time consuming, but is subject to error by reason of the possibility that some critical rotational speed may have been omitted or imperfectly investigated.

The present invention avoids the requirement that the engine be operated at constant speed during an analysis and adapts a conventional heterodyne frequency analyzer to provide a continuous record of the behavior of vibration components of a particular order of vibration as the speed of the engine is varied over its entire operating range. Such an analysis greatly reduces the number of measurements that would otherwise be required for a complete vibration investigation. As there is a limited number of orders or modes of vibration present in any given engineer, a record of the variations in amplitude of vibrations of any given order with changes in engine speed can be obtained for each order of vibration present in the engine. If excessive vibration is encountered for any order of vibration, the difficulty can be more readily corrected as the source or sources which excite vibrations of a particular order are frequently known.

In order to adapt a conventional analyzer for such investigations, it is essential that the analyzer tuning be synchronized with a desired order of vibration. That is, the analyzer should be automatically tuned to successively select from the complex vibration pattern produced at each engine speed that frequency component which is related to the engine speed by the particular order of vibration under investigation as the engine speed is varied throughout the entire operating range. This has been accomplished in one form of known analyzer by mechanically changing the tuning of the analyzer by a servo system actuated from the output of an electric generator the speed of which is controlled in accordance with the speed of the engine. However, such systems possess inherent lags in response and present considerable difficulty in matching their displacement characteristics with the frequency adjusting characteristics of the analyzer to make the frequency thereof a linear function of engine speed and to provide exact tracking over the operating speed range of the rotating machine.

Accordingly, it is the general object of the present invention to provide an improved heterodyne frequency analyzer adapted to provide vibration analyses as the vibration producing agency is varied over a wide range of operating speeds. Another object is to provide an improved heterodyne frequency analyzer which is automatically tuned to follow any desired order of vibration without the use of a servo-mechanism for adjusting the frequency thereof.

The above and other objects, together with the features and advantages attending the invention, will appear more fully from the following detailed description and drawing which is a block diagrammatic showing of a heterodyne frequency analyzer in accordance with a preferred embodiment of the invention.

Referring to the drawing, the portion of the diagram not enclosed in dashed outline is a conventional heterodyne frequency analyzer such, for example, as the Electrical Research Products type RA–277 which comprises a vibration sensing transducer 1, an amplifier 2, a high frequency oscillator 3, a balanced modulator 4, a band-pass filter 5, a demodulator 6, a low-pass filter 7, an amplifier 8, a graphic level recorder 9, a rectifier 10, and an indicating meter 11.

Considering first the operation of the conventional analyzer, the transducer 1 may be any type of transducer or sensing device such, for example, as a Consolidated type 4–102A velocity type vibration pick-up mounted on the engine, and transmits an electrical reproduction of the complex vibration pattern of the rotating machine to the amplifier 2. The complex signal is composed of components, the principal frequencies of which can be expressed as $ns$, as mentioned hereinabove. After amplification, the complex signal is applied to the modulator 4 through a switch S–1 where the individual components $n_1s$, $n_2s$, $n_3s$, . . . $ns$ thereof are heterodyned with a signal of frequency F applied thereto from oscillator 3 through a switch S–2 and are each translated to a new frequency position $F \pm n_1s$, $F \pm n_2s$, . . . , $F \pm ns$ determined by the frequency of oscillator 3. Oscillator 3 is of adjustable frequency and, in the aforementioned frequency analyzer, can be tuned over a range of approximately 41 kc. to 50 kc.

The above series of modulation products appearing in the output of modulator 4 is applied to the filter 5 which has a narrow pass-band of 5 C. P. S. centered at 50 kc. Thus, only the modulation product in the output of modulator 4 which has the value $F \pm ns = 50$ kc. will be selected and passed through filter 5. It is apparent therefore that the frequency F of the oscillator 3 must differ from the center frequency (50 kc.) of the filter 5 by the frequency of the particular order of vibration under investigation, that is, $F=50$ kc.$-ns$. The output of filter 5 is then applied to the demodulator 6 where it is mixed with another part of the oscillator signal $F=50$ kc.$-ns$ applied to the demodulator 6. The output of the demodulator 6 will include modulation products which are the sum and difference of the oscillator signal, 50 kc.$-ns$, and the output of filter 5 (50 ks.). The upper and lower sideband modulation products, 100 kc.$-ns$ and $ns$ appearing in the output of the demodulator 6 are then applied to the low-pass filter 7 which has an upper cut-off limit of approximately 10 kc. Therefore, only the lower sideband or difference frequency $ns$ from the demodulator 6 will appear in the output of filter 7. The output of the filter 7 is then applied to the amplifier 8 through a switch S–3 actuable with switch S–1 and its magnitude recorded by the graphic level recorder 9 or converted to D. C. by the rectifier 10 and its amplitude indicated by meter 11. The graphic level recorder 9 may be the Electrical Research Products type RA–246 recorder designed for use with the RA–277 frequency analyzer or any suitable pen recording device, the chart of which is moved manually or by a suitable follow-up system.

From the foregoing discussion, it can be seen that, for a particular component $ns$ of the complex signal from the transducer 1 to be selected by the analyzer, the frequency F of oscillator 3 must be tuned to 50 kc.$-ns$.

Turning now to the portion of the block diagram enclosed within the dashed lines, the components thereof adapt a conventional frequency analyzer to provide vibrational analyses in terms of the rotational speed of the device under test and comprise a generator 13, an amplitude control device 14, a balanced modulator 15, a fixed oscillator 16, and a band-pass filter 17. The generator 13 may be any type of sine wave alternating current generator or equivalent device that can be suitably coupled to the rotating machine under study so that its output frequency will always be related to the rotational speed by a preselected ratio corresponding to the particular order of vibration under investigation. Such a generator, for example, might be an Elinco type ESP sine wave generator the shaft of which is directly geared to the rotating machine. The output of the generator 13 is passed through an amplitude control device such, for example, as a standard automatic volume control circuit, so as to present a constant amplitude signal of frequency $ns$ to the balanced modulator 15, which may be of conventional design.

The oscillator 16 is a high stability fixed frequency oscillator having only sufficient adjustment to compensate for any unavoidable, long-time frequency drift, such, for example, as a resistance-capacity tuned oscillator of the type illustrated at page 505 of the "Radio Engineers' Handbook" by F. E. Terman published in 1943 by the McGraw-Hill Book Company. The frequency of oscillator 16 is set at the mid-frequency (50 kc.) of filter 5 in the heterodyne analyzer. The 50 kc. signal from oscillator 16 is applied to the balanced modulator 15 and heterodyned with the signal from the generator 13 of frequency $ns$. The output of the modulator 15 will then contain the sum and difference frequency components (50 kc.$+ns$) and (50 kc.$-ns$), the carrier frequency (50 kc.) being suppressed in the balanced modulator.

The output of the modulator 15 is then applied to band-pass filter 17 which has an upper cut-off limit of 50 kc. Its lower cut-off frequency is established by the operating range of the analyzer with which the invention is to be used and, in the case of the Electrical Research Products analyzer, the lower limit of filter 17 could be 40 kc., for example. The filter 17 should have a very high rejection in the stop-bands and could be a crystal or perhaps a lattice-type filter, the design and theory of which is described on pages 238–244 of the aforementioned "Radio Engineers' Handbook."

With the filter 17 adjusted to pass only frequencies between 40 kc. and 50 kc., only the lower side band (50 kc.$-ns$), of the modulation products from the modulator 15 will appear in the output of the filter as a single frequency to be applied to the modulator 4 through switch S–2. This is the same frequency to which the oscillator 3 must be tuned in order that the component $ns$ of the complex vibration from transducer 1 will pass through the analyzer. Thus, by replacing the output of the manually tuned oscillator 3 in the heterodyne frequency analyzer with the output from band-pass filter 17, only that component of the complex vibration signal generated by transducer 1, which has the value $ns$, will pass through the analyzer to be indicated by the meter 15 or recorded by the graphic level recorder 9 as has been described above.

It can be readily seen, therefore, that, regardless of variation in rotational speed of the machine under study, the analyzer will always be tuned properly to pass only the frequency component $ns$. If, for example, the machine under study is a 6-cylinder gasoline engine and it is desired to study the behavior of the engine to firing frequency $n=3$, and generator 13 is geared to the engine so that its output frequency is $3s$, the analyzer, regardless of engine speed, will always be tuned to firing frequency. The plot obtained on the graphic level recorder would then be a continuous record of vibration amplitude at firing frequencies, three times the engine speed, as the latter is varied over the operating range of the engine where the ordinate of the chart represents vibration amplitude and the abscissa is engine R. P. M.

In order to calibrate the automatically-tuned analyzer of the present invention, a signal from an external generator, whose frequency lies somewhere in the range of interest, can be inserted in the system both at the transducer 1 and tachometer generator 13, and the oscillator 16 adjusted for maximum output of the analyzer.

With switch S–2 thrown to the left, the adjustable oscillator 3 is connected in circuit with the analyzer which with its associated graphic level recorder may be used in conventional manner to obtain the usual vibration amplitude versus frequency chart at a constant engine speed. Such an analysis affords an indication of the various orders of vibration present in the engine. Switch S–2 is then thrown to the right to disconnect the oscillator 3 and to adapt the analyzer for use with the present invention so as to obtain a record of the vibration amplitude versus engine speed for any particular order of vibration investigated. By changing the gearing between the generator 13 and the engine, for example, such a record can be obtained for each order of vibration present, thereby affording a quick, reliable and complete investigation of the vibration characteristics of the engine over its range of operating speed.

Although a specific embodiment of the invention has been shown and described, it will be understood that it is but illustrative and that various modifications may be made therein without departing from the spirit and scope thereof.

What is claimed is:

1. A vibration analyzer for analyzing complex vibrations in terms of the rotational speed of a variable vibration producing agency comprising, in combination, means for converting said vibrations into electrical waves, means for generating a fixed high frequency signal, means for generating a variable low frequency signal related in frequency to the rotational speed of said agency by a preselected ratio corresponding to a particular order of vibration of said agency, electronic mixing means connected to both of said generating means for combining said fixed high frequency signal and said variable low frequency signal, means coupled to said mixing means and to said converting means for modulating said electronically mixed signals with said electrical waves, band-pass filter means connected to said modulating means for selecting from said modulated waves those components thereof corresponding to said particular order of vibration, means coupled to said band-pass filter and to said mixing means for demodulating said selected components of said modulated waves from said combined signals, and means coupled to said demodulating means for exhibiting the magnitude of said demodulated selected components.

2. A vibration analyzer for analyzing complex vibrations in terms of the rotational speed of a variable vibration producing agency, comprising, in combination, means for converting said vibrations into electrical waves, means coupled to said converting means for effecting a variable frequency translation of said electrical waves as said vibration producing agency is varied over its range of operating speed, said means including means for generating a fixed high frequency signal, means coupled to said agency for generating a variable low frequency signal related in frequency to the rotational speed of the agency by a preselected ratio corresponding to a particular order of vibration thereof, electrical mixing means connected to both of said generating means for combining said fixed high frequency signal with said variable low frequency signal, means coupled to said electrical mixing means and to said vibration converting means for modulating said combined signals with said electrical waves to effect said variable frequency translation thereof, band-pass filter means connected to said modulating means for selecting from said translated electrical waves those components thereof corresponding to said order of rotational vibration, means coupled to said mixing means and to said band-pass filter means for demodulating said selected components of said translated electrical waves from said combined signals and restoring said selected components to their original frequency position, and means coupled to said demodulating means for exhibiting the magnitude of said restored components.

3. A vibration analyzer for analyzing complex vibrations in terms of the rotational speed of a variable vibration producing agency comprising, in combination, transducing means for converting said vibrations into electrical waves, means coupled to said agency for generating a variable low frequency signal related in frequency to the rotational speed of said agency in accordance with a preselected ratio corresponding to a particular order of vibration thereof, means for generating a fixed high frequency signal, electronic mixing means connected to both of said generating means for modulating said fixed high frequency signal with said variable low frequency signal, a first band-pass filter means connected to said mixing means for selecting one of the side-bands resulting from the modulation of said high frequency signal and said low frequency signal, means connected to said first band-pass filter means and to said transducing means for modulating said selected side-band with said electrical waves from said transducer, a second band-pass filter means connected to said last named modulating means and centered at the frequency of said fixed high frequency signal for selecting from said modulated electrical waves those components thereof corresponding to said particular order of vibration, means including demodulating means coupled to said first and second band-pass filter means for demodulating said selected components of said modulated electrical waves from said selected side-band resulting from said first-mentioned modulation and restoring said selected components to their original frequency position, and means coupled to said demodulating means for exhibiting the magnitude of said selected components.

4. A vibration analyzer for analyzing complex vibrations in terms of the rotational speed of a variable vibration producing agency comprising, in combination, transducing means for converting said vibrations into electrical waves, means for generating a fixed high frequency signal, means connected to said agency for generating a variable low frequency signal related in frequency to the rotational speed of said agency by a preselected ratio corresponding to a particular order of rotational vibration thereof, means connected to said low frequency generating means for maintaining the amplitude of said variable low frequency signal substantially constant as said agency is varied over its range of operating speeds, electronic modulating means connected to said high frequency generating means and to said last named means for combining said high frequency signal with said variable low frequency signal, a first band-pass filter means connected to said modulating means for selecting one of the side-bands resulting from said modulation of said high frequency and said low frequency signals, means connected to said first band-pass filter means and to said transducing means for modulating said selected side-band with said electrical waves, a second band-pass filter means having a narrow pass-band centered at the frequency of said high frequency signal and connected to receive the output of said last-named modulating means, means connected to said first and to said second band-pass filter means for demodulating the output of said second band-pass filter means from the output of said first band-pass filter, low-pass filter means connected to said demodulating means to pass the lower side-band modulation products in the output of said demodulating means, and recording means connected to the output of said low-pass filter means.

5. A vibration analyzer for analyzing complex vibrations in terms of the rotational speed of a variable vibration producing agency comprising, in combination, a vibration pickup for converting said vibrations into electrical waves, a fixed high frequency signal generator, a variable low frequency generator for generating a signal related in frequency to the rotational speed of said agency by a preselected ratio corresponding to a particular order of vibration of said agency, a first electronic modulator connected to both of said generating means for combining said high frequency signal and said variable low frequency signal, a second modulator coupled to said first modulator and to said vibration pick-up for modulating the combined high frequency and low frequency signals with said electrical waves, a narrow band-pass filter connected to said second modulator for selecting from the resulting modulated electrical waves those components thereof corresponding to said particular order of vibration, means coupled to said first modulator and to said band-pass filter for demodulating said selected component of said modulated electrical waves from said combined signals, and means coupled to said demodulating means for recording the magnitude of said selected components.

6. In apparatus adapted to perform an automatic vibration analysis of a particular order of vibration of a vibration producing agency as the speed of the agency is varied over the operating range thereof, the combination of means for sensing and converting vibrations produced by said agency into electrical waves representative thereof, means for generating a fixed high frequency signal, means coupled to said agency for generating a variable low frequency signal related in frequency to the speed of the agency by a preselected ratio corresponding to the particular order of vibration under investigation, means connected to both of said generating means for electrically mixing said fixed high frequency signal and said variable low frequency signal to obtain a resulting high frequency signal the frequency of which varies in accordance with changes in the speed of said agency without adjusting the setting of said fixed high frequency generating means, means coupled to said electrical mixing means and to said vibration sensing and converting means for effecting a variable frequency translation of said electrical vibration waves with the variable high frequency signal resulting from the mixing of said fixed high frequency signal and variable low frequency signal, means connected to said translating means for selecting from said translated electrical vibration waves those components thereof corresponding to said particular order of vibration as the speed of said agency is varied over its operating range, means coupled to said selecting means and to said mixing means for restoring said selected components of said translated electrical vibration waves to their original frequency position, and means coupled to said restoring means for exhibiting the magnitude of said restored components as a function of the speed of said agency.

References Cited in the file of this patent

UNITED STATES PATENTS

| 2,361,990 | Brown | Nov. 7, 1944 |
| 2,377,349 | MacKenzie | June 5, 1945 |

FOREIGN PATENTS

| 633,815 | Great Britain | Dec. 30, 1949 |